(12) United States Patent
Jiang et al.

(10) Patent No.: US 10,710,176 B2
(45) Date of Patent: Jul. 14, 2020

(54) ELLIPTICAL ULTRASONIC MACHINING DEVICE POWERED BY NON-CONTACT INDUCTION

(71) Applicant: BEIHANG UNIVERSITY, Beijing (CN)

(72) Inventors: Xinggang Jiang, Beijing (CN); Deyuan Zhang, Beijing (CN)

(73) Assignee: BEIHANG UNIVERSITY, BeiJing (CN)

( * ) Notice: Subject to any disclaimer, the term of this patent is extended or adjusted under 35 U.S.C. 154(b) by 214 days.

(21) Appl. No.: 15/972,110

(22) Filed: May 5, 2018

(65) Prior Publication Data
US 2018/0250758 A1    Sep. 6, 2018

(30) Foreign Application Priority Data
May 12, 2017   (CN) .......................... 2017 1 0334183

(51) Int. Cl.
| | |
|---|---|
| *B23C 5/16* | (2006.01) |
| *B06B 1/06* | (2006.01) |
| *B23C 9/00* | (2006.01) |
| *B23C 5/10* | (2006.01) |
| *B06B 3/00* | (2006.01) |
| *B23C 5/26* | (2006.01) |
| *B23Q 1/00* | (2006.01) |
| *B23B 31/02* | (2006.01) |
| *B23B 37/00* | (2006.01) |

(52) U.S. Cl.
CPC .................. *B23C 5/16* (2013.01); *B06B 1/06* (2013.01); *B06B 3/00* (2013.01); *B23B 31/02* (2013.01); *B23B 37/00* (2013.01); *B23C 5/10* (2013.01); *B23C 5/26* (2013.01); *B23C 9/005* (2013.01); *B23Q 1/0027* (2013.01); *B23B 2260/108* (2013.01); *B23B 2270/10* (2013.01); *B23C 2270/10* (2013.01); *B23Q 2230/004* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0257579 A1* | 11/2007 | Liu | ........................... | B06B 3/00 |
| | | | | 310/323.19 |
| 2008/0121679 A1* | 5/2008 | Li | ............................ | B06B 3/00 |
| | | | | 228/1.1 |

(Continued)

*Primary Examiner* — Bryan P Gordon (57) ABSTRACT

An elliptical ultrasonic machining device powered by non-contact induction mainly includes an induction power supply device and an elliptical ultrasonic spindle shank, wherein: induction power supply secondary units of the induction power supply device encircle a spindle shank shell of the elliptical ultrasonic spindle shank; induction power supply primary units are arranged at a primary magnetic core seat outside the elliptical ultrasonic spindle shank; the primary magnetic core seat and the elliptical ultrasonic spindle shank have a same circle center, and a small gap exists between the primary magnetic core seat and the elliptical ultrasonic spindle shank; the primary magnetic core seat is fastened on a machine tool spindle seat of a machine tool through a support and keeps still; the elliptical ultrasonic spindle shank is mounted on a machine tool spindle through a taper shank and rotates with the spindle in a high speed.

4 Claims, 3 Drawing Sheets

(56) References Cited

U.S. PATENT DOCUMENTS

2009/0146530 A1* 6/2009 Tang .................... B23B 31/083
                                                    310/323.18
2016/0129542 A1* 5/2016 Chen ....................... B24B 1/04
                                                         451/37

* cited by examiner

ELLIPTICAL ULTRASONIC MACHINING DEVICE POWERED BY NON-CONTACT INDUCTION

CROSS REFERENCE OF RELATED APPLICATION

The application claims priority under 35 U.S.C. 119(a-d) to CN 201710334183.4, filed May 12, 2017.

BACKGROUND OF THE PRESENT INVENTION

Field of Invention

The present invention relates to an ultrasonic machining device, and more particularly to an elliptical ultrasonic machining device powered by non-contact induction, belonging to a technical field of ultrasonic machining.

Description of Related Arts

Ultrasonic machining technology is a special machining method based on traditional cutting machining combined with vibration of ultrasonic frequency to realize material removal. Compared with the traditional cutting machining, the ultrasonic machining is able to decrease the cutting force, cutting temperature and tool wear, and increase the surface accuracy. Thus, the ultrasonic machining technology is suitable for machining of various difficult-to-machine materials and difficult-to-machine structures, and especially suitable for finish machining of the hard and brittle material, such as ceramic and glass, and the carbon fiber composite material.

The vibration of the ultrasonic machining has two forms, respectively the unidirectional vibration and the elliptical vibration. The elliptical vibration is to excite two independent groups of piezoelectric ceramic stacks respectively in two perpendicular directions, and the resultant movement trail is an ellipse. Compared with the unidirectional vibration, the elliptical vibration has the lower cutting force and better process effect.

According to the American patent application of US 2010/0158307 A1, published on Jun. 24, 2010, Ultrasonic spindle system, the spindle system adopts a non-contact induction power supply device to supply power to the rotary ultrasonic transducer, with only one group of power supply coils; and the transducer is fixed inside the spindle, which is unable to realize the automatic tool change.

According to the Chinese patent publication of CN 103157593 A, published on Jun. 19, 2013, Ultrasonic elliptical vibration milling spindle shank device, the tail end of the spindle shank is a high-precision extension bar and is connected with the cutter head of the machine tool through the spring chuck, and power is supplied to the rotary elliptical ultrasonic transducer through the conductive slip ring. According to the Chinese patent publication of CN 104624461 A, published on May 20, 2015, Lateral excitation ultrasonic elliptical vibration milling spindle shank, the standard BT50 spindle shank is adopted and connected with the machine tool spindle, and power is supplied to the rotary elliptical ultrasonic transducer through the conductive slip ring.

For the conventional elliptical ultrasonic machining devices, the adopted power supply modes are all mechanical contact power supply. During the rotation process, the mechanical contact point easily generates the spark, and the rotation speed is limited, which is especially unable to meet the automatic tool change requirement of the machine tool.

SUMMARY OF THE PRESENT INVENTION

For the above problems, an object of the present invention is to provide an elliptical ultrasonic machining device powered by non-contact induction, so as to meet requirements of high-speed rotation of an ultrasonic spindle, stable and reliable power supply, and automatic tool change. Particularly, in order to realize power supply of the elliptical ultrasonic machining device, two independent induction power supply signals are required.

In order to accomplish the above objects, the present invention adopts following technical solutions.

An elliptical ultrasonic machining device powered by non-contact induction mainly comprises an induction power supply device and an elliptical ultrasonic spindle shank, wherein: induction power supply secondary units of the induction power supply device are arranged at a spindle shank shell of the elliptical ultrasonic spindle shank; induction power supply primary units of the induction power supply device are arranged at a primary magnetic core seat outside the elliptical ultrasonic spindle shank; the primary magnetic core seat and the elliptical ultrasonic spindle shank have a same circle center, and a relatively small gap exists between the primary magnetic core seat and the elliptical ultrasonic spindle shank; the primary magnetic core seat is fastened on a machine tool spindle seat of a machine tool through a support and keeps still; the elliptical ultrasonic spindle shank is mounted on a machine tool spindle of the machine tool through a taper shank, and rotates with the spindle in a high speed;

the induction power supply device comprises two independent loosely coupled transformers, wherein: the two loosely coupled transformers are arranged along an axis direction, up and down; each loosely coupled transformer consists of one induction power supply primary unit and one induction power supply secondary unit; the induction power supply primary units are embedded in the primary magnetic core seat, and the primary magnetic core seat is fastened on the machine tool spindle seat of the machine tool through the support and keeps still; the induction power supply secondary units encircle the spindle shank shell and rotate with the machine tool spindle in the machine tool spindle seat of the machine tool in a high speed, and a small gap exists between each induction power supply primary unit and the corresponding induction power supply secondary unit;

each induction power supply primary unit consists of a primary magnetic core and a primary coil, wherein: the primary coil is wound in a U-shaped inner circular groove and on an outer circular surface of the primary magnetic core, and the primary coil is connected with an external ultrasonic power supply through a wire hole on the primary magnetic core seat; and, both of the primary magnetic core and the primary coil are arranged inside the primary magnetic core seat;

the primary magnetic core seat has an incomplete annular structure with a circumference of 150°; ladder-shaped U-shaped grooves are opened inside the primary magnetic core seat for placing the primary magnetic cores and the primary coils; and, a support hole for connecting with the support and the wire hole for passing through by the primary coils are opened on the primary magnetic core seat;

each primary magnetic core has an incomplete annular structure with a circumference of 120°, and a U-shaped groove is opened on an inner circular surface of each primary magnetic core, namely the U-shaped inner circular groove;

each primary coil is a stranded enameled wire, comprising copper wires and a nylon cover, wherein insulating varnish is coated on the copper wires and the nylon cover wraps the copper wires;

each induction power supply secondary unit consists of a secondary magnetic core and a secondary coil, wherein: the secondary magnetic core is arranged inside a U-shaped annular groove of a secondary magnetic core seat of the spindle shank shell; the secondary coil is wound inside a U-shaped groove of the secondary magnetic core and is connected with an elliptical ultrasonic transducer inside the spindle shank shell through a wire hole on the secondary magnetic core seat;

the secondary magnetic core seat consists of two U-shaped annular grooves which are arranged along the axis direction, showing a complete annular structure; a width of each U-shaped annular groove is consistent with that of each secondary magnetic core; two parallel wire holes are opened at a bottom part of each U-shaped annular groove and are distributed symmetrically in 180°;

each secondary magnetic core is formed through connecting two semi-annular magnetic cores together and arranged inside the secondary magnetic core seat; the U-shaped groove is opened on an outer circular surface of each secondary magnetic core; and each secondary magnetic core is made of manganese zinc ferrite;

each secondary coil is a stranded enameled wire, comprising copper wires and a nylon cover, wherein insulating varnish is coated on the copper wires and the nylon cover wraps the copper wires;

the elliptical ultrasonic spindle shank consists of the spindle shank shell, the elliptical ultrasonic transducer, a tool, a rivet and bolts, wherein: the tool is connected with the elliptical ultrasonic transducer through a hot charging head; the elliptical ultrasonic transducer is fixed inside the spindle shank shell through the bolts; the whole elliptical ultrasonic spindle shank is fixed on the machine tool spindle of the machine tool through the rivet and rotates with the spindle in a high speed;

the spindle shank shell is designed and modified based on a standard spindle shank (BT, SK, BBT, HSK), comprising the taper shank, an annular groove, the secondary magnetic core seat, an inner cavity and bolt holes, wherein: the taper shank is located at a tail part of the spindle shank shell, for connecting with the machine tool spindle of the machine tool; the annular groove is located at a middle part of the spindle shank shell; the secondary magnetic core seat is located at a head part of the spindle shank shell, and the wire holes are opened at the bottom part of each U-shaped annular groove of the secondary magnetic core seat; and the inner cavity is opened inside the spindle shank shell;

the taper shank is consistent with a taper shank of the standard BT spindle shank, and is able to be fixed on the machine tool spindle of the machine tool to rotate with the spindle in a high speed;

the annular groove is consistent with an annular groove of the standard BT spindle shank and meets an automatic tool change requirement;

the secondary magnetic core seat has been described when illustrating the induction power supply device and is not repeated;

the inner cavity has a ladder-shaped cylindrical cavity structure, for placing the elliptical ultrasonic transducer;

the bolt holes are threaded holes of M4*1, for fixing a flange plate of the elliptical ultrasonic transducer;

the elliptical ultrasonic transducer consists of an ultrasonic horn, a piezoelectric ceramic stack, a back cover plate, copper electrodes, and an insulation sleeve, wherein: a screw is arranged at a large end of the ultrasonic horn with the insulation sleeve sleeved on an outer surface of the screw; an inner hole of the back cover plate has thread thereon, and the back cover plate presses the piezoelectric ceramic stack together through a preset pre-tightening force;

the ultrasonic horn has a ladder-shaped cylindrical structure with datum lines of cylindrical sections ensured to be coaxial, wherein: the screw is arranged at the large end of the ultrasonic horn; a threaded hole is opened at a small end of the ultrasonic horn for fixing the hot charging head; the flange plate is arranged at a middle part of the ultrasonic horn, for fixing the ultrasonic horn to the inner cavity of the spindle shank shell;

the piezoelectric ceramic stack consists of four groups of semi-annular ceramic wafers which are arranged according to different polarization directions;

the back cover plate has a cylindrical structure with a threaded hole opened inside, and a surface of the back cover plate contacting the piezoelectric ceramic stack is smooth;

each copper electrode has an annular structure with a thickness of 0.2 mm; and, an outer diameter and an inner diameter of each copper electrode are consistent with that of the piezoelectric ceramic stack;

the insulation sleeve has a tubular structure and is made of insulation material such as tetrafluoroethylene and nylon; the insulation sleeve is sleeved on the screw arranged at the ultrasonic horn, so that the copper electrodes are insulated from each other; and according to different machining types, the tool can be a milling cutter, a drill bit, a diamond grinding tool and so on; the tool tightly fits the hot charging head in a hot charging manner; and the hot charging head is fixed to a fore part of the ultrasonic horn of the elliptical ultrasonic transducer in a thread form.

In conclusion, it can be known that the present invention is an elliptical ultrasonic machining device powered by two independent non-contact inductions. Compared with the prior art, the present invention has following beneficial effects.

Firstly, the primary magnetic core seat where the induction power supply primary units are arranged and the secondary magnetic core seat where the induction power supply secondary units are arranged have the same circle center, and the secondary magnetic core seat is located inside the primary magnetic core seat, so that a rotation radius of the elliptical ultrasonic spindle shank is decreased, a rotation inertia thereof is lowered, and a rotation stability of the elliptical ultrasonic spindle shank is increased.

Secondary, the primary magnetic core seat has an incomplete annular column structure with a circumference of about 150°, which meets an automatic tool change requirement; moreover, no mechanical connection exists between the primary magnetic core seat and the secondary magnetic core seat, so that the automatic tool change requirement can be met without changing the structure of the machine tool spindle of the machine tool.

Thirdly, the two independent loosely coupled transformers of the induction power supply device are arranged along the axis direction of the spindle, up and down; and, the two transformers have the same structure and do not interfere with each other, so that the two-phase power supply requirement of the elliptical ultrasonic spindle shank is met.

In figures: 1: elliptical ultrasonic power supply; 2: elliptical ultrasonic spindle shank; 3: rivet; 4: machine tool spindle of machine tool; 5: machine tool spindle seat of machine tool; 6: spindle shank shell; 61: taper shank; 62: annular groove; 63: secondary magnetic core seat; 64: inner cavity; 65: wire hole; 66: bolt hole; 7: elliptical ultrasonic transducer; 71: ultrasonic horn; 711: screw; 712: flange plate; 72: semi-annular ceramic wafer; 73: copper electrode; 74: back cover plate; 75: insulation sleeve; 8: tool; 81: hot charging head; 9: induction power supply device; 91: induction power supply primary unit; 911: primary magnetic core seat; 9111: support hole; 9112: wire hole; 912: primary magnetic core; 913: primary coil; 92: induction power supply secondary unit; 921: secondary magnetic core; 922: secondary coil; 10: support; and 11: bolt.

DETAILED DESCRIPTION OF THE PREFERRED EMBODIMENT

Figure 1:
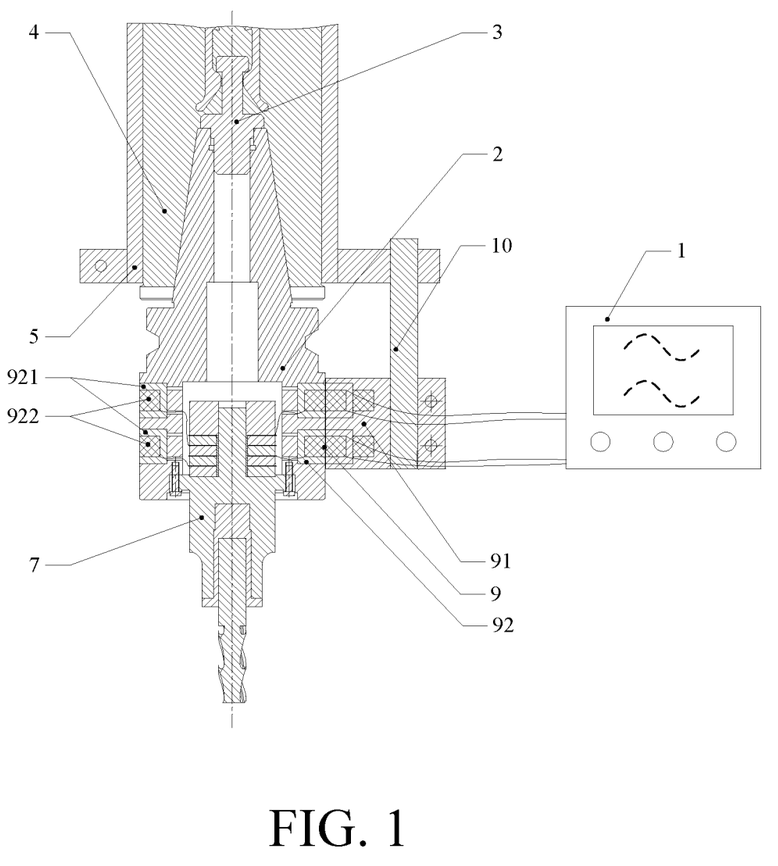
FIG. 1 is a sectional view of an elliptical ultrasonic machining device powered by non-contact induction according to a preferred embodiment of the present invention.

As shown in FIG. 1, according to a preferred embodiment of the present invention, an elliptical ultrasonic machining device comprises an elliptical ultrasonic power supply 1, an induction power supply device 9, an elliptical ultrasonic spindle shank 2, and a machine tool spindle 4 of a machine tool. The present invention is further described with accompanying drawings as follows.

As shown in FIG. 1, an elliptical ultrasonic machining device powered by non-contact induction mainly comprises an induction power supply device 9 and an elliptical ultrasonic spindle shank 2, wherein: induction power supply secondary units 92 of the induction power supply device 9 are arranged at a BT spindle shank shell 6 of the elliptical ultrasonic spindle shank 2; induction power supply primary units 91 of the induction power supply device 9 are arranged at a primary magnetic core seat 911 outside the elliptical ultrasonic spindle shank 2; the primary magnetic core seat 911 and the elliptical ultrasonic spindle shank 2 have a same circle center, and a relatively small gap exists between the primary magnetic core seat 911 and the elliptical ultrasonic spindle shank 2; the primary magnetic core seat 911 is fastened on a machine tool spindle seat 5 of a machine tool through a support 10 and keeps still; the elliptical ultrasonic spindle shank 2 is mounted on a machine tool spindle 4 of the machine tool through a taper shank 61 and rotates with the spindle 4 in a high speed; an elliptical ultrasonic power supply 1 is independent from the machine tool and keeps still. During specific machining process, excitation signals are provided by the elliptical ultrasonic power supply 1; and, through the induction power supply device 9, power supply to the elliptical ultrasonic spindle shank 2 is realized.

The outputted signals of the elliptical ultrasonic power supply 1 have a frequency ranging between 15-40 kHz, and a frequency resolution of 1 Hz.

The induction power supply device 9 comprises two independent loosely coupled transformers, wherein: the two loosely coupled transformers are arranged along an axis direction, up and down; each loosely coupled transformer consists of one induction power supply primary unit 91 and one induction power supply secondary unit 92; the induction power supply primary units 91 are embedded in the primary magnetic core seat 911, and the primary magnetic core seat 911 is fastened on the machine tool spindle seat 5 of the machine tool through the support 10 and keeps still; the induction power supply secondary units 92 encircle the BT spindle shank shell 6 and rotate with the machine tool spindle 4 in the machine tool spindle seat 5 of the machine tool in a high speed, and a relatively small gap exists between each induction power supply primary unit and the corresponding induction power supply secondary unit.

Figure 2:
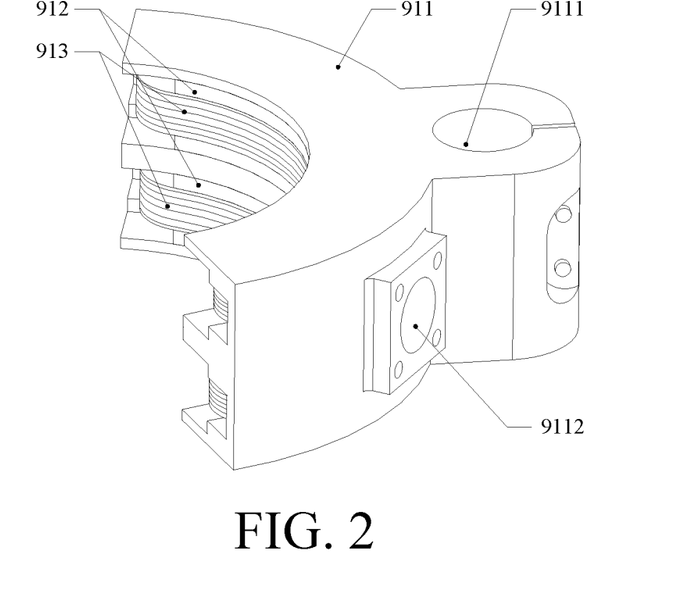
FIG. 2 is a structural sketch view of induction power supply primary units and a primary magnetic core seat according to the preferred embodiment of the present invention.

Each induction power supply primary unit 91 consists of a primary magnetic core 912 and a primary coil 913; the primary coil 913 is wound in a U-shaped inner circular groove and on an outer circular surface of the primary magnetic core 912; the primary coil 913 is connected with the external elliptical ultrasonic power supply 1 through a wire hole 9112 on the primary magnetic core seat 911; both of the primary magnetic core 912 and the primary coil 913 are arranged inside the primary magnetic core seat 911 and sealed by epoxy resin adhesive, as shown in FIG. 2.

The primary magnetic core seat 911 has an incomplete annular structure with a circumference of 150°, so as to meet an automatic tool change requirement; ladder-shaped U-shaped grooves are opened inside the primary magnetic core seat for placing the primary magnetic cores 912 and the primary coils 913; and, a support hole 9111 for connecting with the support 10 and the wire hole 9112 for passing through by the primary coils 913 are opened on the primary magnetic core seat.

Each primary magnetic core 912 has an incomplete annular structure with a circumference of 120°; a U-shaped groove is opened on an inner circular surface of each primary magnetic core, namely the U-shaped inner circular groove; each primary magnetic core is made of manganese zinc ferrite, so as to increase energy conversion efficiency.

Each primary coil 913 is a fifty-core enameled wire with a core diameter of 0.1 mm, comprising copper wires and a nylon cover, wherein insulating varnish is coated on the copper wires and the nylon cover wraps the copper wires; and the number of turns is generally 40-60.

Figure 3:
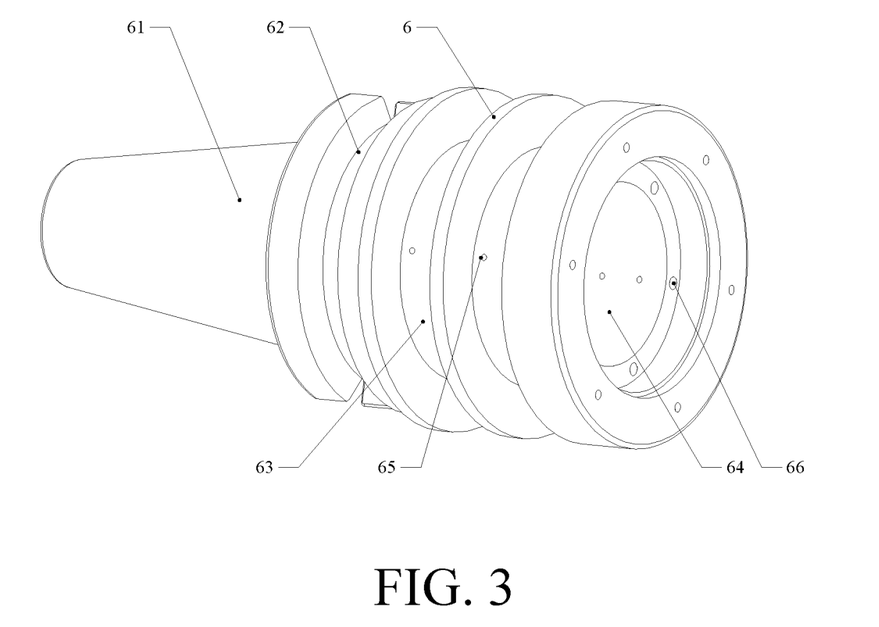
FIG. 3 is a sketch view of a spindle shank shell according to the preferred embodiment of the present invention.

Each induction power supply secondary unit 92 consists of a secondary magnetic core 921 and a secondary coil 922; the secondary magnetic core 921 is arranged inside a U-shaped annular groove of a secondary magnetic core seat 63 of the BT spindle shank shell 6; the secondary coil 922 is wound inside a U-shaped groove of the secondary magnetic core 921 and is connected with copper electrodes 73 of an elliptical ultrasonic transducer 7 inside the BT spindle shank shell 6 through a wire hole 65 on the secondary magnetic core seat 63; the specific number of turns of each secondary coil is determined by a matched inductance of the elliptical ultrasonic transducer 7; and, the secondary coil 922 is wound inside the secondary magnetic core 921 and is sealed by epoxy resin adhesive.

As shown in FIG. 3, the secondary magnetic core seat 63 consists of two U-shaped annular grooves which are arranged along the axis direction and shows a complete annular structure; each U-shaped annular groove has a width consistent with that of each secondary magnetic core 921 and is in a loose fit relation with the corresponding secondary magnetic core; an inner diameter of each U-shaped annular groove is consistent with that of each secondary magnetic core 921; an outer diameter of each U-shaped annular groove is consistent with that of each secondary magnetic core 921; two parallel wire holes 65 are opened at a bottom part of each U-shaped annular groove and are distributed symmetrically in 180°, so as to enable the corresponding secondary coil 922 to pass through.

Each secondary magnetic core 921 is formed through connecting two semi-annular magnetic cores together and arranged inside the secondary magnetic core seat 63; the U-shaped groove is opened on an outer circular surface of each secondary magnetic core 921; and each secondary magnetic core 921 is made of manganese zinc ferrite.

Each secondary coil 922 is a stranded enameled wire, comprising copper wires and a nylon cover, wherein insulating varnish is coated on the copper wires and the nylon cover wraps the copper wires.

The elliptical ultrasonic spindle shank 2 consists of the BT spindle shank shell 6, the elliptical ultrasonic transducer 7, a tool 8, a rivet 3 and bolts 11, wherein: the tool 8 is connected with the elliptical ultrasonic transducer 7 through a hot charging head 81; the elliptical ultrasonic transducer 7 is fixed inside the BT spindle shank shell 6 through the bolts; the whole elliptical ultrasonic spindle shank 2 is mounted on the machine tool spindle 4 of the machine tool through the rivet 3 and rotates with the spindle in a high speed.

The BT spindle shank shell 6 is designed and modified based on a standard BT spindle shank, as shown in FIG. 3, comprising the taper shank 61, an annular groove 62, the secondary magnetic core seat 63, an inner cavity 64 and bolt holes 66, wherein: the taper shank 61 is located at a tail part of the BT spindle shank shell 6; the annular groove 62 is located at a middle part of the BT spindle shank shell 6; the secondary magnetic core seat 63 is located at a head part of the BT spindle shank shell 6; the wire holes are opened at the bottom part of each U-shaped annular groove of the secondary magnetic core seat; and the inner cavity is opened inside the BT spindle shank shell 6.

The taper shank 61 is consistent with a taper shank of the standard BT spindle shank, and is able to be mounted on the machine tool spindle 4 of the machine tool.

The annular groove 62 is consistent with an annular groove of the standard BT spindle shank and meets the automatic tool change requirement.

The secondary magnetic core seat 63 has been described when illustrating the induction power supply device 9 and is not repeated.

The inner cavity 64 is a ladder-shaped cylindrical cavity, for placing the elliptical ultrasonic transducer 7 and for ventilation to realize air cooling.

The bolt holes 66 are threaded holes of M4*1, for fixing a flange plate 712 of the elliptical ultrasonic transducer 7.

Figure 4:
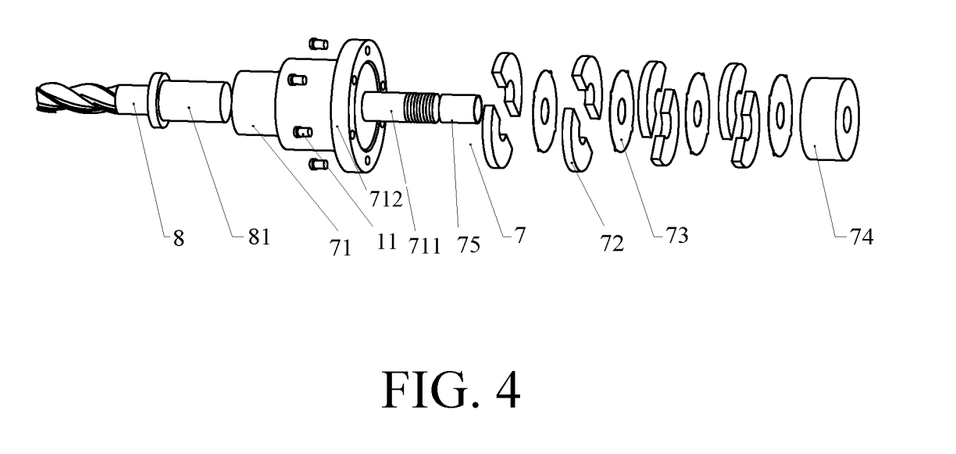
FIG. 4 is an exploded view of an elliptical ultrasonic transducer according to the preferred embodiment of the present invention.

As shown in FIG. 4, the elliptical ultrasonic transducer 7 consists of an ultrasonic horn 71, a piezoelectric ceramic stack, a back cover plate 74, copper electrodes 73, and an insulation sleeve 75, wherein: a screw 711 is arranged at a large end of the ultrasonic horn 71 with the insulation sleeve 75 sleeved on an outer surface of the screw; an inner hole of the back cover plate 74 has thread thereon; the back cover plate presses the piezoelectric ceramic stack together through a preset pre-tightening force, and datum lines thereof are ensured to be coaxial; and, the piezoelectric ceramic stack is electrically connected with the secondary coils 922 through the copper electrodes 73.

The ultrasonic horn 71 has a ladder-shaped cylindrical structure with datum lines of cylindrical sections ensured to be coaxial; the ultrasonic horn 71 is made of stainless steel; the screw 711 is arranged at the large end of the ultrasonic horn 71, and a threaded hole is opened at a small end of the ultrasonic horn for fixing the hot charging head 81; the flange plate 712 is arranged at a middle part of the ultrasonic horn 71, for fixing the ultrasonic horn to the inner cavity of the BT spindle shank shell 6.

The piezoelectric ceramic stack consists of four groups of semi-annular ceramic wafers 72 which are arranged according to different polarization directions, and is made of PZT-8.

The back cover plate 74 has a cylindrical structure with a threaded hole opened inside and is made of stainless steel; and a surface of the back cover plate contacting the piezoelectric ceramic stack is required to be smooth.

Each copper electrode 73 has an annular structure with a thickness of 0.2 mm; and, an outer diameter and an inner diameter of each copper electrode are consistent with that of the piezoelectric ceramic stack.

The insulation sleeve 75 has a tubular structure and is made of insulation material such as tetrafluoroethylene and nylon; the insulation sleeve is sleeved on the screw 711 arranged at the ultrasonic horn 71, so that the copper electrodes 73 are insulated from each other.

The tool 8 is a standard four-edge milling cutter. The tool 8 tightly fits the hot charging head 81 in a hot charging manner. The hot charging head 81 is fixed to a fore part of the ultrasonic horn 71 of the elliptical ultrasonic transducer 7 in a thread form.

In conclusion, the present invention provides an elliptical ultrasonic machining device powered by non-contact induction, for ultrasonic machining. For the induction power supply device 9 provided by the present invention, the induction power supply primary unit 91 is separated from the corresponding induction power supply secondary unit 92, causing the non-negligible leakage inductance between the primary unit 91 and the secondary unit 92, a relatively large reactive power consumption at the circuits of the primary unit 91 and the secondary unit 92, and a decrease of the transmission capability of the induction power supply device 9. Thus, it is required to add a capacitive compensation element on the circuit of the induction power supply device 9, so as to eliminate the negative influence on the transmission capability of the induction power supply device 9 due to the leakage inductance. The machining device provided by the present invention utilizes the capacitive reactance of the elliptical ultrasonic transducer 7 and the leakage inductance of the induction power supply secondary unit 92 for the direct impedance matching. Therefore, at a condition without adding any compensation element, not only the impedance matching of the elliptical ultrasonic transducer 7 is ensured, but also the generated reactive power loss of the induction power supply device 9 due to the leakage inductance is compensated. Through the above measure, not only the good vibration effect of the elliptical ultrasonic transducer 7 is ensured, but also the present invention has a compact structure, a small rotation inertia, and a stable rotation.

The working process of the present invention is described as follows. The elliptical ultrasonic spindle shank 2 rotates with the machine tool spindle 4 of the machine tool in a high speed; the elliptical ultrasonic power supply 1 outputs two ultrasonic-frequency voltage signals which have the same frequency and a certain phase difference, and the signals are transmitted to the primary coils 913 through wires; the induction power supply primary units 91 generate two cross magnetic fluxes, and the two magnetic fluxes are inducted by the induction power supply secondary units 91; then, according to the Lenz law, the induction power supply secondary units 92 generate the current; through the secondary coils 922, the two-phase power supply of the elliptical ultrasonic transducer 7 is realized. Through utilizing the inverse piezoelectric effect of the piezoelectric ceramic stack, the elliptical ultrasonic transducer 7 generates the vibrations in two mutually perpendicular directions, and the tool 8 is driven to generate the elliptical vibration, so as to process the workpiece with the ultrasonic milling machining, which greatly increases the cutting efficiency and the process effect. During the machining process, the automatic tool change can be conducted and the workpiece can be cut under a cutting fluid environment.

The above-mentioned is merely a part of the embodiments of the present invention, and the protection scope of the present invention is not limited thereto. The variations and modifications which can be easily obtained by one skilled in the art based on the disclosed technical scope of the present invention are all encompassed within the protection scope of the present invention.

What is claimed is:

1. An elliptical ultrasonic machining device powered by non-contact induction, comprising an induction power supply device (9) and an elliptical ultrasonic spindle shank (2), wherein: induction power supply secondary units (92) of the induction power supply device (9) encircle a BT spindle shank shell (6) of the elliptical ultrasonic spindle shank (2); induction power supply primary units (91) of the induction power supply device (9) are arranged at a primary magnetic core seat (911) outside the elliptical ultrasonic spindle shank (2); the primary magnetic core seat (911) and the elliptical ultrasonic spindle shank (2) have a same circle center, and a relatively small gap exists between the primary magnetic core seat and the elliptical ultrasonic spindle shank; the primary magnetic core seat (911) is fastened on a machine tool spindle seat (5) of a machine tool through a support (10) and keeps still; the elliptical ultrasonic spindle shank (2) is mounted on a machine tool spindle (4) of the machine tool through a taper shank (61), and rotates with the spindle (4) in a high speed;

the induction power supply device (9) comprises two independent loosely coupled transformers, wherein: the two loosely coupled transformers are arranged along an axis direction, up and down; each loosely coupled transformer consists of one induction power supply primary unit (91) and one induction power supply secondary unit (92); the induction power supply primary units (91) are embedded in the primary magnetic core seat (911), and the primary magnetic core seat is fastened on the machine tool spindle seat (5) of the machine tool through the support (10) and keeps still; the induction power supply secondary units (92) encircle the BT spindle shank shell (6) and rotate with the machine tool spindle (4) in the machine tool spindle seat (5) of the machine tool in a high speed, and a relatively small gap exists between each induction power supply primary unit and the corresponding induction power supply secondary unit;

each induction power supply primary unit (91) consists of a primary magnetic core (912) and a primary coil (913), wherein: the primary coil (913) is wound in a U-shaped inner circular groove and on an outer circular surface of the primary magnetic core (912), and the primary coil is connected with an external ultrasonic power supply (1) through a wire hole (9112) on the primary magnetic core seat (911); and, both of the primary magnetic core (912) and the primary coil (913) are arranged inside the primary magnetic core seat (911);

the primary magnetic core seat (911) has an incomplete annular structure with a circumference of 150°; ladder-shaped U-shaped grooves are opened inside the primary magnetic core seat for placing the primary magnetic cores (912) and the primary coils (913); and, a support hole (9111) for connecting with the support (10) and the wire hole (9112) for passing through by the primary coils (913) are opened on the primary magnetic core seat;

each primary magnetic core (912) has an incomplete annular structure with a circumference of 120°, and a U-shaped groove is opened on an inner circular surface of each primary magnetic core, namely the U-shaped inner circular groove;

each primary coil (913) is a stranded enameled wire, comprising copper wires and a nylon cover, wherein insulating varnish is coated on the copper wires and the nylon cover wraps the copper wires;

each induction power supply secondary unit (92) consists of a secondary magnetic core (921) and a secondary coil (922), wherein: the secondary magnetic core (921) is arranged inside a U-shaped annular groove of a secondary magnetic core seat (63) of the BT spindle shank shell (6); the secondary coil (922) is wound inside a U-shaped groove of the secondary magnetic core (921) and is connected with an elliptical ultrasonic transducer (7) inside the BT spindle shank shell (6) through a wire hole (65) on the secondary magnetic core seat (63);

the secondary magnetic core seat (63) consists of two U-shaped annular grooves which are arranged along the axis direction, showing a complete annular structure; a width of each U-shaped annular groove is consistent with that of each secondary magnetic core (921); two parallel wire holes (65) are opened at a bottom part of each U-shaped annular groove and are distributed symmetrically in 180°;

each secondary magnetic core (921) is formed through connecting two semi-annular magnetic cores together and arranged inside the secondary magnetic core seat (63); and the U-shaped groove is opened on an outer circular surface of each secondary magnetic core;

each secondary coil (922) is a stranded enameled wire, comprising copper wires and a nylon cover, wherein insulating varnish is coated on the copper wires and the nylon cover wraps the copper wires;

the elliptical ultrasonic spindle shank (2) consists of the BT spindle shank shell (6), the elliptical ultrasonic transducer (7), a tool (8), a rivet (3) and bolts (11), wherein: the tool (8) is connected with the elliptical ultrasonic transducer (7) through a hot charging head (81); the elliptical ultrasonic transducer (7) is fixed inside the BT spindle shank shell (6) through the bolts (11); the whole elliptical ultrasonic spindle shank (2) is fixed on the machine tool spindle (4) of the machine tool through the rivet (3) and rotates with the spindle (4) in a high speed;

the BT spindle shank shell (6) is designed and modified based on a standard BT spindle shank, comprising the taper shank (61), an annular groove (62), the secondary magnetic core seat (63), an inner cavity (64) and bolt holes (66), wherein: the taper shank (61) is located at a tail part of the BT spindle shank shell (6), for connecting with the machine tool spindle (4) of the machine tool; the annular groove (62) is located at a middle part of the BT spindle shank shell (6); the secondary magnetic core seat (63) is located at a head part of the BT spindle shank shell (6), and the wire holes (65) are opened at the bottom part of each U-shaped annular groove of the secondary magnetic core seat; and the inner cavity is opened inside the BT spindle shank shell (6);

the taper shank (61) is consistent with a taper shank of the standard BT spindle shank, and is able to be fixed on the machine tool spindle (4) of the machine tool to rotate with the spindle (4) in a high speed;

the annular groove (62) is consistent with an annular groove of the standard BT spindle shank and meets an automatic tool change requirement;

the secondary magnetic core seat (63) has been described when illustrating the induction power supply device (9) and is not repeated;

the inner cavity (64) has a ladder-shaped cylindrical cavity structure, for placing the elliptical ultrasonic transducer (7);

the bolt holes (66) are threaded holes of M4*1, for fixing a flange plate (712) of the elliptical ultrasonic transducer (7);

the elliptical ultrasonic transducer (7) consists of an ultrasonic horn (71), a piezoelectric ceramic stack, a back cover plate (74), copper electrodes (73), and an insulation sleeve (75), wherein: a screw (711) is arranged at a large end of the ultrasonic horn (71) with the insulation sleeve (75) sleeved on an outer surface of the screw; an inner hole of the back cover plate (74) has thread thereon, and the back cover plate presses the piezoelectric ceramic stack together through a preset pre-tightening force;

the ultrasonic horn (71) has a ladder-shaped cylindrical structure with datum lines of cylindrical sections ensured to be coaxial, wherein: the screw (711) is arranged at the large end of the ultrasonic horn; a threaded hole is opened at a small end of the ultrasonic horn for fixing the hot charging head (81); the flange plate (712) is arranged at a middle part of the ultrasonic horn (71), for fixing the ultrasonic horn to the inner cavity of the BT spindle shank shell (6);

the piezoelectric ceramic stack consists of four groups of semi-annular ceramic wafers (72) which are arranged according to different polarization directions;

the back cover plate (74) has a cylindrical structure with a threaded hole opened inside, and a surface of the back cover plate contacting the piezoelectric ceramic stack is smooth;

each copper electrode (73) has an annular structure; and, an outer diameter and an inner diameter of each copper electrode are consistent with that of the piezoelectric ceramic stack;

the insulation sleeve (75) has a tubular structure and is made of insulation material; the insulation sleeve is sleeved on the screw (711) arranged at the ultrasonic horn (71), so that the copper electrodes (73) are insulated from each other; and according to different machining types, one of a milling cutter, a drill bit and a diamond grinding tool is selected to serve as the tool (8); the tool (8) tightly fits the hot charging head (81) in a hot charging manner; and the hot charging head (81) is fixed to a fore part of the ultrasonic horn (71) of the elliptical ultrasonic transducer (7) in a thread form.

2. The elliptical ultrasonic machining device powered by the non-contact induction, as recited in claim 1, wherein each secondary magnetic core (921) is made of manganese zinc ferrite.

3. The elliptical ultrasonic machining device powered by the non-contact induction, as recited in claim 1, wherein each copper electrode (73) with the annular structure has a thickness of 0.2 mm.

4. The elliptical ultrasonic machining device powered by the non-contact induction, as recited in claim 1, wherein the insulation sleeve (75) is made of tetrafluoroethylene or nylon.

* * * * *